(12) United States Patent
Moss et al.

(10) Patent No.: US 9,339,948 B2
(45) Date of Patent: May 17, 2016

(54) POLYURETHANE BEND STIFFENER

(71) Applicants: Robert M. Moss, Glossop (GB); Ian Robert Mycock, High Peak (GB); Gareth Roberts, Stockport (GB); Andrew Martin Davies, Aston-under-lyne (GB)

(72) Inventors: Robert M. Moss, Glossop (GB); Ian Robert Mycock, High Peak (GB); Gareth Roberts, Stockport (GB); Andrew Martin Davies, Aston-under-lyne (GB)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/427,250

(22) PCT Filed: Sep. 24, 2013

(86) PCT No.: PCT/US2013/061468
§ 371 (c)(1),
(2) Date: Mar. 10, 2015

(87) PCT Pub. No.: WO2014/052331
PCT Pub. Date: Apr. 3, 2014

(65) Prior Publication Data
US 2015/0246465 A1  Sep. 3, 2015

Related U.S. Application Data

(60) Provisional application No. 61/705,711, filed on Sep. 26, 2012.

(51) Int. Cl.
*E21B 17/01* (2006.01)
*B29C 31/10* (2006.01)
(Continued)

(52) U.S. Cl.
CPC ............. *B29C 31/10* (2013.01); *C08G 18/4854* (2013.01); *C08G 18/7671* (2013.01); *E21B 17/017* (2013.01); *B29K 2075/00* (2013.01); *H02G 9/02* (2013.01); *H02G 9/12* (2013.01)

(58) Field of Classification Search
CPC .............. E21B 17/017; E21B 41/0007; E21B 43/0107; F16L 1/20
USPC ............. 166/341, 345, 367; 405/168.1, 168.2
See application file for complete search history.

(56) References Cited

U.S. PATENT DOCUMENTS 4,703,135 A    10/1987  Magnani
5,470,935 A *  11/1995  Mafoti et al. ................... 528/65

(Continued)

FOREIGN PATENT DOCUMENTS

EP    865458 A    8/2005
GB    2487506 A   7/2012

OTHER PUBLICATIONS

Hepburn, "Trends in Polyurethane Elastomer Technology", Iranian J. Polym. Sci. and Technol. vol. 1. Aug. 1992.

*Primary Examiner* — Matthew R Buck
(74) *Attorney, Agent, or Firm* — Gary C Cohn PLLC

(57) ABSTRACT

A bend stiffener comprises a (i) a flexible polymeric sleeve having an axial bore for receiving an elongated flexible member and (ii) attachment means for attaching the sleeve to a support. At least a portion of the flexible polymeric sleeve is a polyurethane elastomer produced in a reaction of an isocyanate-terminated prepolymer and a curing agent at an isocyanate index of 90 to 120. The isocyanate-terminated prepolymer has an isocyanate content of 7 to 15% by weight and is a reaction product of at least one aromatic polyisocyanate and at least one polyether polyol having a hydroxyl equivalent weight of 350 to 2000 and a nominal functionality of 2 to 2.3. The curing agent is one or more chain extenders having an equivalent weight per isocyanate-reactive group of up to 125 or a mixture of one or more such chain extenders and one or more polyether polyols having a hydroxyl equivalent weight of 350 to 2000 and a nominal functionality of 2 to 2.3. The hard segment content of the polyurethane elastomer is from 40 to 60% by weight.

17 Claims, 2 Drawing Sheets

(51) Int. Cl.
    *C08G 18/48* (2006.01)
    *C08G 18/76* (2006.01)
    *H02G 9/02* (2006.01)
    *H02G 9/12* (2006.01)
    *B29K 75/00* (2006.01)

(56) References Cited

U.S. PATENT DOCUMENTS

| | | | |
|---|---|---|---|
| 5,526,846 A * | 6/1996 | Maloberti | 138/109 |
| 6,220,303 B1 | 4/2001 | Secher | |
| 6,706,776 B2 * | 3/2004 | Markusch et al. | 521/170 |
| 7,387,469 B2 | 6/2008 | Duggan | |
| 7,469,722 B2 | 12/2008 | Berland | |
| 7,967,070 B2 | 6/2011 | Reddy | |
| 8,033,302 B2 * | 10/2011 | Standal et al. | 138/126 |
| 2007/0024051 A1 * | 2/2007 | Witz et al. | 285/242 |
| 2009/0151789 A1 | 6/2009 | Sheldrake | |
| 2010/0213015 A1 | 8/2010 | Clevelario | |
| 2011/0094614 A1 * | 4/2011 | Leroy | C08G 18/092 138/145 |
| 2012/0202945 A1 * | 8/2012 | Schmidt et al. | 524/590 |

* cited by examiner

POLYURETHANE BEND STIFFENER

This invention relates to polyurethane bend stiffeners.

Many types of devices are characterized as being both highly elongated and somewhat flexible. Examples of such devices include rope, cable, electrical and fiber optic cables, tubing, pipe, and other conduits.

It is often the case that these elongated, flexible devices are attached to some supporting apparatus at their ends, or at spaced intervals along their length, and are otherwise unsecured and therefore free to move relative to the supporting apparatus between those points of attachment. A common example is that of electrical lines mounted onto support towers. The mounted electrical lines are blown by the wind and therefore move in relation to the towers.

Many marine cabling and piping systems are similar. For example, in oil production, well treatment fluids often are delivered to the well, and production fluids are withdrawn from the well, through flexible conduits (pipes, hoses, etc.) These conduits lead from the wellhead to the oil production platform. They are fastened at or near the wellhead, at the platform, and sometimes to intermediate support structures. Between the points of attachment, these conduits are free to move relative to the wellhead and platform under the force of moving water. In the case of a floating platform, the platform itself usually is moving as well.

Forces tend to concentrate at the point of attachment of the elongated flexible device to the supporting apparatus. These forces can easily damage the elongated flexible device itself, and/or the support apparatus. Devices known as "bend stiffeners" frequently are employed to ameliorate this risk. As their name implies, bend stiffeners provide localized stiffening of the device near the point of attachment. The stiffening distributes the accumulated forces along a greater length of the elongated device. This reduces the concentration of force at the point of attachment to the support, and in that manner reduces the risk of damage.

Bend stiffeners of many designs are known. Among the many known designs are those described in U.S. Pat. Nos. 4,703,135, 7,387,469 and 7,967,070. Bend stiffeners typically include an elongate flexible sleeve that receives and embraces the elongated flexible device. It is this sleeve that provides the desired stiffening.

It will be appreciated that the sleeve itself also must be flexible, or else it will simply transfer forces from the point of attachment to the support to the end of the sleeve, rather than distribute them over the length of the sleeve. Therefore, the sleeve is often made of a flexible polymeric material. One such flexible polymer material that has been used is a polyurethane elastomer. An advantage of a polyurethane elastomer is that it is produced from low molecular weight materials that are liquid at room temperature and can be handled easily.

The demands on the sleeve, and therefore on the flexible polymeric material, can be very stringent, particularly in marine applications and/or oil production applications. Fatigue resistance is very important, as this relates to the life expectancy of the material. The bend stiffener must perform well over a range of temperature conditions, and in particular should exhibit the necessary stiffness and flexibility over that range of use temperatures. Hydrolytic stability is an important attribute, especially in marine applications.

Although bend stiffeners for some applications can be as small as a few grams, those used in industrial applications are often quite massive. Bend stiffener sleeves in certain marine applications often weigh 500 to 4000 kg or more, and sometimes stand six meters or more in height.

This very large size creates a considerable obstacle to obtaining the necessary performance. Elastomeric polymers generally exhibit low hysteresis loss, meaning that the polymer is able to return most of the energy used to distort it (for example, to stretch, squeeze, twist and/or bend it) as it experiences mechanical distortion during use. However, the hysteresis loss is never zero, which means that some of this energy is converted to heat, which must be dissipated. Highly massive bend stiffeners do not dissipate this heat rapidly, and so localized heating can be produced. This localized heating can lead to a breakdown of the polymeric structure, which in turn results in cracking or other signs of fatigue.

The large size of these bend stiffeners also presents a manufacturing challenge, which also relates to product performance. Polyurethane bend stiffeners are prepared in a curing reaction between a polyisocyanate and one or more isocyanate-reactive compounds. This reaction is exothermic, and heat is generated as the curing reaction proceeds. In addition, it is common to apply heat to the curing reaction mixture to drive the cure so the part can be demolded. In making large molding such as these bend stiffeners, it is very difficult to maintain uniform temperature conditions throughout the mass of curing material. As a result, it is difficult to obtain a consistent cure throughout such a large mass of polymer. This leads to an incomplete development of polymer properties and can lead to inconsistent polymer properties within the part. This leads to inadequate performance, particularly in fatigue resistance, and a large temperature dependence in modulus properties.

Therefore, there is a need to provide a bend stiffener sleeve having greater fatigue resistance and which performs well over a wide range of service temperatures.

This invention is in one aspect a bend stiffener comprising (i) a flexible polymeric sleeve having an axial bore for receiving an elongated flexible member and (ii) attachment means for attaching the sleeve to a support, wherein all or a portion of the flexible polymeric sleeve is a polyurethane elastomer produced in a reaction of an isocyanate-terminated prepolymer and a curing agent at an isocyanate index of 90 to 120, wherein the isocyanate-terminated prepolymer has an isocyanate content of 7 to 15% by weight and is a reaction product of at least one aromatic polyisocyanate and at least one polyether polyol having a hydroxyl equivalent weight of 350 to 2000 and a nominal functionality of 2 to 2.3, and wherein the curing agent is one or more chain extenders having an equivalent weight per isocyanate-reactive group of up to 125 or a mixture containing one or more such chain extenders and one or more polyether polyols having a hydroxyl equivalent weight of 350 to 2000 and a nominal functionality of 2 to 2.3, and the hard segment content of the polyurethane elastomer is from 40 to 60% by weight.

The invention is an another aspect a method of making a flexible bend stiffener sleeve, comprising mixing an isocyanate-terminated prepolymer and a curing agent at an isocyanate index of 90 to 120, introducing the resulting mixture into a mold and curing the mixture in the mold to form a polyurethane elastomer constituting all or a portion of the sleeve, wherein the isocyanate-terminated prepolymer has an isocyanate content of 7 to 15% by weight and is a reaction product of at least one aromatic polyisocyanate and at least one polyether polyol having a hydroxyl equivalent weight of 350 to 2000 and a nominal functionality of 2 to 2.3 and wherein the curing agent is one or more chain extenders or a mixture containing one or more such chain extenders and one or more polyether polyols having a hydroxyl equivalent weight of 350 to 2000 and an average nominal functionality of 2 to 2.3, and the hard segment content of the polyurethane elastomer is from 40 to 60% by weight.

Applicants have found that the polyurethane in this bend stiffener sleeve exhibits remarkably useful properties. In particular, the polyurethane portion of the bend stiffener sleeve of the invention exhibits excellent fatigue resistance. The polyurethane also retains its stiffness (as expressed as tensile modulus) very well over a broad temperature range. Surprisingly the polyurethane is significantly better in these respects than other elastomeric polyurethanes made using similar materials in a one-shot or semi-prepolymer process rather than the full prepolymer process described herein. Polyurethanes made in one-shot or semi-prepolymer processes tend to have inferior fatigue resistance and/or more temperature-dependent stiffness properties, even when made using the same starting materials.

Figure 1:
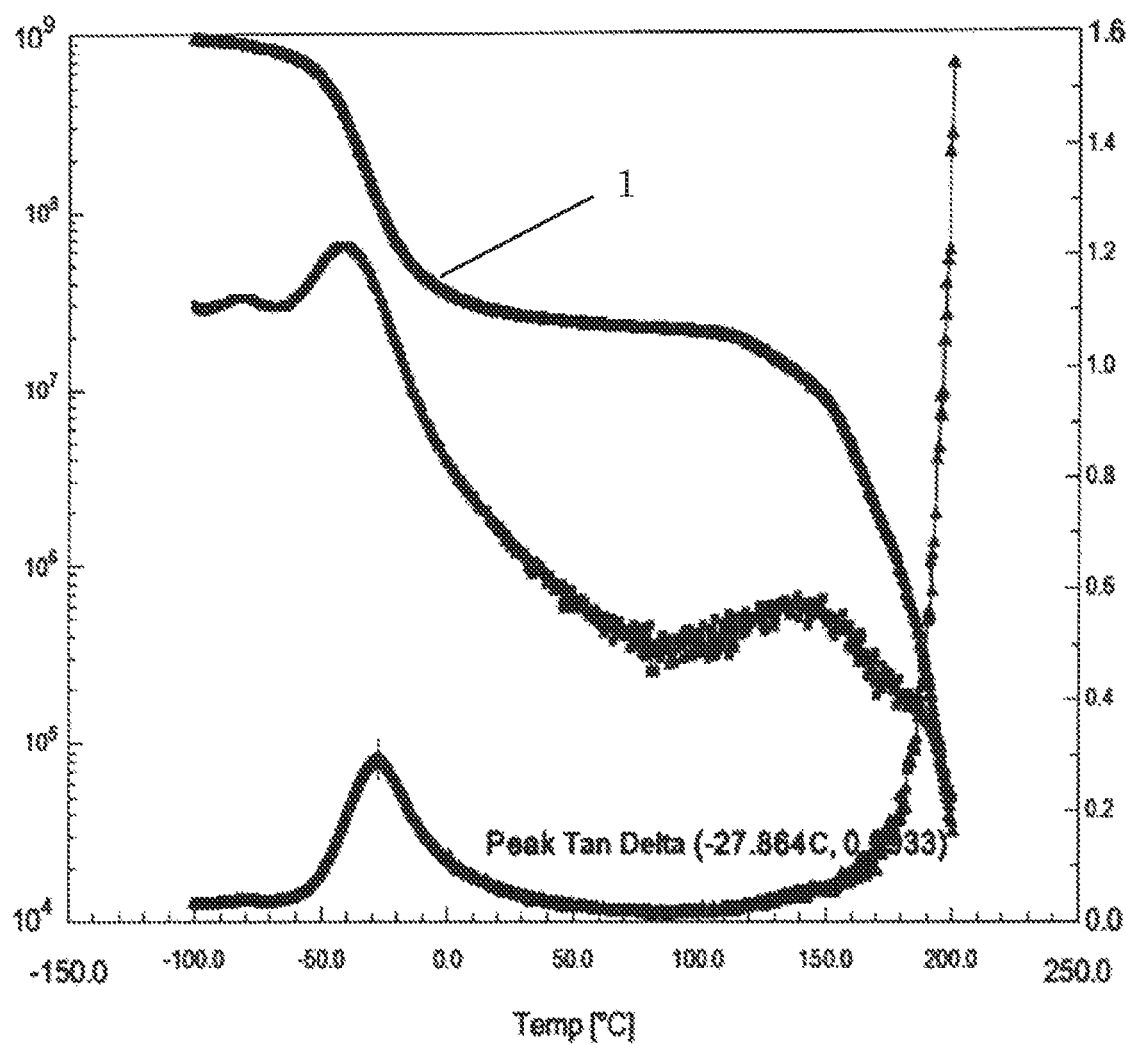
FIG. 1 is a differential thermal analysis tracing for an embodiment of the invention.

The bend stiffener of the invention includes a sleeve and attachment means. The sleeve is an elastomeric polyurethane member which has an axial bore for receiving a flexible member, such as a rope, cable, electrical and/or fiber optic cables, tubing, pipe, and other conduit. The sleeve is typically elongate, by which it is meant that its length (i.e., its extension along its axial length) is greater than its largest diameter. The sleeve may have a generally tubular shape. It may be frusto-conical (i.e., having the shape of a truncated cone).

In embodiments of particular interest the sleeve has a mass of at least 500 kg, such as from 500 to 4000 kg, and a length of at least 2 meters, such as from 2 to 10 meters. The axial bore in these embodiments may have a diameter of 0.1 to 2 meters.

The sleeve can be a unitary structure (made up of only once piece of elastomeric polyurethane) or may be made up of two or more elements that are assembled together to form the sleeve. The sleeve may be, for example, a segmented or articulated type as described in U.S. Pat. Nos. 7,469,722 and 4,703,135.

The attachment means can have any design that is adapted to connect the sleeve to the support. The specific design of the attachment means will of course be selected to meet the requirements of the specific application. A wide variety of such attachment means have been described in the art are entirely suitable. These include, for example, various types of flanges that can be partially or entirely embedded in the sleeve or otherwise affixed thereto, as well as various end plate designs such as described in U.S. Pat. No. 7,469,722, connecting flanges as described in U.S. Pat. No. 6,220,303, locating cylinder-and-sleeve arrangements such as described in U.S. Pat. No. 7,387,469, and guide connector and latch assemblies as described in U.S. Pat. No. 7,967,070.

The elastomeric polyurethane sleeve is produced in a reaction of an isocyanate-terminated prepolymer and a curing agent. The prepolymer is a reaction product of at least one polyisocyanate and at least one polyether polyol having an equivalent weight per isocyanate-reactive group of 350 to 2000 and a nominal functionality of 2 to 2.3. The isocyanate content of the prepolymer is 7 to 15% by weight, which corresponds to an isocyanate equivalent weight of 600 to 280. A more preferred isocyanate content is 9 to 12%, which corresponds to an isocyanate equivalent weight of 467 to 350.

The aromatic polyisocyanate used to make the prepolymer include m-phenylene diisocyanate, 2,4- and/or 2,6-toluene diisocyanate (TDI), the various isomers of diphenylmethane-diisocyanate (MDI), naphthylene-1,5-diisocyanate, methoxyphenyl-2,4-diisocyanate, 4,4'-biphenylene diisocyanate, 3,3'-dimethoxy-4,4'-biphenyl diisocyanate, 3,3'-dimethyl-diphenylmethane-4,4'-diisocyanate, 4,4',4"-triphenylmethane triisocyanate, polymethylene polyphenylisocyanates, hydrogenated polymethylene polyphenylisocyanates, toluene-2,4,6-triisocyanate, and 4,4'-dimethyl diphenylmethane-2,2',5,5'-tetraisocyanate. Preferred polyisocyanates have an average of 2 to 2.3 isocyanate groups per molecule, especially from 2 to 2.2 isocyanate groups per molecule. Especially preferred polyisocyanates are diphenylmethane diisocyanate (MDI), including the 2,4'-, 2,2'- and 4,4'-isomers or mixtures of two or more of such isomers.

The polyether polyol used to make the prepolymer preferably has a hydroxyl equivalent weight of 350 to 1000, more preferably 350 to 750 and still more preferably 400 to 600. Two or more polyether polyols having a hydroxyl equivalent weight of 350 to 2000 and a nominal functionality of 2 to 2.3 can be used to make the prepolymer. In such a case, the average hydroxyl equivalent weight of the mixture is preferably 350 to 1000, more preferably 350 to 750 and still more preferably 400 to 600.

The polyether polyol(s) used to make the prepolymer are polymers of one or more polymerizable cyclic ethers, made by polymerizing the cyclic ether(s) onto one or more initiator compounds that have oxyalkylatable groups such as hydroxyl, primary amino or secondary amino groups. Hydroxyl-containing initiators are preferred. The cyclic ether may be, for example, an oxirane such as ethylene oxide, propylene oxide, 1,2-butylene oxide, and styrene oxide. Among these, propylene oxide or a mixture of propylene oxide and ethylene oxide containing up to 12% by weight ethylene oxide are preferred. For marine applications or other applications in which hydrolytic stability is important, propylene oxide by itself is more preferred among these oxiranes. The cyclic ether in some embodiments is tetramethylene oxide (tetrahydrofuran). Homopolymers of tetramethylene oxide are especially preferred.

The "nominal functionality" of a polyether polyol refers to the average number of alkoxylatable groups per molecule on the initiator compound(s) used to make the polyether polyol. Actual functionalities may be somewhat lower than nominal functionalities in some instances.

Polyol, chain extender and crosslinker equivalents weights are number average molecular weights, and can be determined by titration methods.

Difunctional initiators that are useful for producing the polyether polyol include, for example, water, ethylene glycol, diethylene glycol, triethylene glycol, 1,2-propane diol, dipropylene glycol, tripropylene glycol and the like. A mixture of a difunctional initiator and a higher-functionality initiator may be used. Such higher-functionality initiators include, for example, glycerin, trimethylolpropane, trimethylolethane, pentaerythritol and the like.

The prepolymer can be prepared in known manner by reacting an excess of the aromatic polyisocyanate(s) with the polyether polyol(s). A chain extender and/or crosslinker as described below may be included in the prepolymer-forming reaction mixture, provided that the resulting prepolymer has an isocyanate content as described before. Alternatively and preferably, the polyether polyol(s) are the only isocyanate-reactive materials present in the prepolymer forming reaction.

In making the prepolymer, it is preferred to provide from 1 to 1.25, especially 1 to 1.15, moles of aromatic isocyanate compound per equivalent of isocyanate-reactive groups provided by the polyether polyol and any chain extender and/or crosslinker as may be present. This produces a prepolymer having at most a small amount of unreacted aromatic polyisocyanate compound.

In making the prepolymer, the reactants are mixed and permitted to react until a constant isocyanate content is obtained. The reactants may be heated. The reaction preferably is performed in the presence of a catalyst for the reaction of isocyanate groups with hydroxyl groups, including those described below.

An especially preferred prepolymer is a reaction product of MDI with one or more poly(tetramethylene oxide) diol(s) having a hydroxyl equivalent weight of 350 to 750, especially 400 to 600, and no more than 10 parts by weight, preferably no more than 5% parts by weight, of a crosslinker and/or chain extender per 100 parts by weight of the poly(tetramethylene oxide) diol(s). Such especially preferred prepolymer has an isocyanate content of 9 to 12% by weight.

The bend stiffener sleeve is made by reacting the foregoing prepolymer with a curing agent in a mold. The curing agent includes one or more chain extenders having an equivalent weight per isocyanate-reactive group of up to 125. A "chain extender" contains exactly two isocyanate-reactive groups per molecule. The isocyanate reactive groups may be, for example, hydroxyl, primary amino and/or secondary amino groups. Diol chain extenders are preferred. Among these diol chain extenders are, for example, ethylene glycol, diethylene glycol, triethylene glycol, 1,2-propane diol, dipropylene glycol, tripropylene glycol, 1,4-butanediol, 1,6-hexane diol, cyclohexanedimethanol, neopentyl glycol and 1,3-propane diol. 1,3-propane diol is especially preferred.

Chain extenders that contain amine groups include diethyltoluene diamine, phenylene diamine, cyclohexanediamine, isophorone diamine, aminoethylpiperadine, and the like.

The chain extender may be the only isocyanate-reactive component of the curing agent. However, the curing agent may also include one or more polyether polyol(s) as described before. If such a polyether polyol is present in the curing agent, it preferably constitutes no more than 50%, more preferably no more than 25% by weight of the isocyanate-reactive materials present in the curing agent.

The curing agent may also include one or more crosslinkers, by which it is meant compounds having three or more isocyanate-reactive groups per molecule and an equivalent weight per isocyanate-reactive group of 30 to 349. Such crosslinkers include, for example, glycerin, trimethylolpropane, trimethylolethane, pentaerythritol, sorbitol, sucrose and alkoxylates thereof having equivalent weights of up to 349. Such crosslinkers preferably constitute no more than 25%, more preferably no more than 10% of the weight of isocyanate-reactive materials present in the curing agent. The curing agent may be devoid of such crosslinkers.

A preferred curing agent contains one or more chain extenders, from 0 to 25% by weight of a polyether polyol having a hydroxyl equivalent weight of 350 to 2000, and 0 to 10% by weight of one or more crosslinkers, the weight percentages being based on the weight of isocyanate-reactive materials in the curing agent. A more preferred curing agent contains one or more chain extenders, from 0 to 10% by weight of the polyether polyol and from 0 to 10% of one or more crosslinkers. An especially preferred curing agent contains one or more chain extenders and no more than 5% each of the polyether polyol and crosslinker. The curing agent may contain one or more chain extenders as the only isocyanate-reactive mixture.

The components of the prepolymer and curing agent to together with their amounts are selected together such that the hard segment content of the resulting polyurethane elastomer is 40 to 60% by weight. "Hard segment content" is the ratio of the combined weights of the aromatic polyisocyanate used to make the prepolymer plus any chain extender(s) and crosslinker(s) used to make the prepolymer or present in the curing agent, divided by the combined weight of the isocyanate-containing components of the prepolymer and the isocyanate-reactive compounds in the curing agent, i.e., $$\%HS = \frac{wt_{iso} + wt_{ce} + wt_{xl}}{wt_{pp} + wt_{ca}}$$

wherein $wt_{iso}$ is the weight of aromatic isocyanate compounds used in making the prepolymer, $wt_{ce}$ is the combined weight of all chain extenders used in making the prepolymer plus the weight of all chain extenders in the curing agent, $wt_{xl}$ is the weight of all crosslinkers used in making the prepolymer plus the weight of all crosslinkers in the curing agent, $wt_{pp}$ is the weight of the isocyanate-containing compounds in the prepolymer and $wt_{ca}$ is the weight of the isocyanate-reactive compounds in the curing agent. A preferred hard segment content is 45 to 55% by weight.

The prepolymer and curing agent are mixed at proportions to provide an isocyanate index of 90 to 120, preferably 95 to 120 and more preferably 98 to 110. The components may be at ambient temperature at the time they are mixed. Alternatively, either or both of the components may be heated to an elevated temperature such as 35 to 100° C. or 40 to 70° C., prior to mixing them.

The reaction mixture resulting from combining the prepolymer and curing agent is cured in a mold to produce the bend stiffener sleeve. The reaction of the prepolymer and curing agent is exothermic, and therefore can be conducted without applied heat. However, it is preferred to supply heat during the curing reaction, by preheating the mold and/or heating the filled mold, in order to speed the cure and decrease demold times. The mixture is cured in the mold until it has developed sufficient mechanical integrity to be demolded without permanent damage or distortion.

The process of the invention has particular benefits in producing sleeves having a mass at least 500 kg, preferably from 500 to 4000 kg. When very large moldings such as these are produced, it is difficult to produce and maintain uniform temperature conditions throughout the reaction mixture as it cures, because applied heat and the heat generated by the exothermic curing reaction cannot become evenly distributed through the curing mass. In conventional processes for making these large polyurethane bend stiffener sleeves, these non-uniform temperature conditions lead to significant loss of properties, even when the part is subsequently post-cured. An advantage of this invention is that very good property development is seen despite the non-uniformity of temperature. Thus, in some embodiments, at least 500 kg, preferably 500 to 4000 kg of reaction mixture is charged to the mold and cured to form a bend stiffener sleeve which also has a mass of at least 500 kg, preferably 500 to 4000 kg.

The sleeve is demolded once the prepolymer and curing agent have cured sufficiently that the sleeve can be demolded without damage. It is generally preferred to post-cure the sleeve by heating it outside of the mold for a period of 10 minutes to 24 hours, at a temperature of 40 to 120° C., preferably 60 to 100° C., to complete the curing reaction and further develop the mechanical and dynamic properties of the elastomer.

The sleeve is affixed to the attachment means to produce the bend stiffener. This can be done after the sleeve is molded, or can be performed by molding the sleeve onto the attachment means (or some component thereof). In the latter case, the attachment means or portion thereof is at least partially inserted into the mold, and the mixture of prepolymer and curing agent entering the mold at least partially encapsulates the attachment means (or portion) and cures in contact therewith to affix the sleeve to the attachment means or portion.

The bend stiffener of the invention can be used in conventional manner to attach a variety of flexible devices to a supporting apparatus. The point of attachment can be at an end of the flexible device, or at one or more points along the length of the device. The flexible device is inserted into or through the axial bore of the bend stiffener sleeve, and the bend stiffener is affixed to the support via the attachment means. The flexible device may be held securely within the sleeve, so the device cannot move within the sleeve. In other cases, the flexible device is able to slide within the bend stiffener sleeve.

The bend stiffener of the invention is useful, for example, to attach rope, cable, electrical transmission lines, telecommunications transmission lines (including, for example, fiber optic cable), tubing, pipe, hoses or other conduits to a supporting apparatus. By "supporting apparatus", it is meant any structure to which the flexible member is affixed via the bend stiffener. The supporting apparatus may be immobile. Examples of immobile supporting apparatus may include towers, poles, buildings, wellheads, piers, anchoring devices or other structures, as well as geologic formations such as rock formations and biological structures such as trees.

The bend stiffener of the invention is well adapted for use in marine applications in which the bend stiffener is submerged or otherwise exposed to seawater. The supporting apparatus in these undersea applications may be, for example, an undersea wellhead, a buoy, a floating or fixed production platform, a ship or other floating structure. These marine applications often place very severe demands on the bend stiffener sleeve, because the sleeves are often very massive, because very large forces are often applied to the sleeve due to the action of moving water, and because the frequent or constant exposure to seawater potentially can lead to hydrolytic decomposition of the polymer in the bend stiffener sleeve. In applications such as undersea oil and gas productions, the bend stiffener in addition can be exposed to a wide range of temperatures. Bend stiffener sleeves made in accordance with this invention exhibit excellent fatigue resistance, has good hydrolytic stability, and retain good modulus (stiffness) over a wide range of operating temperatures.

In some embodiments, the bend stiffener of the invention is used to secure a flexible oil and/or gas production pipe to one or more points of attachment. These flexible pipes are typically known as "risers" and connect from an undersea wellhead to a floating platform or ship which (i) receives production fluids from the well through the riser and/or (ii) supplies fracturing and/or other well treatment fluids to the well through the riser. The bend stiffener of the invention can be used to attach the flexible pipe to the wellhead, to the floating platform or ship, and/or to intermediate points of attachment such as a buoy or other structure.

The following examples are provided to illustrate the invention, and are not intended to limit the scope thereof. All parts and percentages are by weight unless otherwise indicated.

EXAMPLE 1 AND COMPARATIVE SAMPLE A

An isocyanate-terminated prepolymer is prepared by reacting 57 parts of a 1000 molecular weight difunctional poly (tetramethylene glycol) and 43 parts of MDI. The resulting prepolymer has an isocyanate content of about 9.5% by weight.

A portion of the prepolymer is heated to 80° C. Separately, 1,3-propane diol is heated to 40° C. These materials are mixed at a weight ratio of approximately 1:0.075, degassed and poured into a 2.5 mm deep plaque mold preheated to 90° C. The materials are then cured in the mold for 16 hours at 90° C. The resulting polyurethane elastomer has a hard segment content of 47.5%. It is stored for 48 hours under ambient conditions of temperature and humidity, and taken to physical property testing as indicated in Table 1 below.

Comparative Sample A is prepared by mixing 86.16 parts of a 2000 molecular weight difunctional poly(tetramethylene glycol), 12.60 parts of 1,3-propane diol and 0.25 parts of an organomercury catalyst. This mixture is combined with a quasi-prepolymer of MDI, tripropylene glycol and dipropylene glycol having an isocyanate content of 26.3% by weight, and cured in the same manner as Example 1. Mix ratios are such that Comparative Sample A has a hard segment content of about 48% by weight. Physical property testing is performed on Comparative Sample A as indicated in Table 1.

TABLE 1

| Property | Example 1 | Comp. Sample A |
|---|---|---|
| Shore D Hardness (BS EN ISO 868) | 45 | 48 |
| Tensile Strength, MPa (BS 903 Pt A2) | 52.3 | 35 |
| Elongation at Break, % (BS 903 Pt A2) | 476 | 375 |
| Modulus at 100% strain, MPa (BS 903 Pt A2) | 11.0 | ND |
| 6% Secant Modulus, MPa (BS 903 Pt A2) | 51.5 | 55 |
| 10% Secant Modulus, MPa (BS 903 Pt A2) | 42.2 | 45 |

As can be seen from the data in Table 1, modulus and hardness are very similar for these two elastomers, but Example 1 exhibits significantly higher tensile strength and elongation.

Each of Example 1 and Comparative Sample A are analyzed by dynamic thermal analysis to evaluate modulus properties across a range of temperatures. Results are indicated graphically in FIGS. 1 and 2. In FIG. 1 indicates results for Example 1 and FIG. 2 indicates results for Comparative Sample A. In each graph, the line indicated by the reference symbol (1 in FIG. 1 and A in FIG. 2) represents the modulus. As can be seen in FIG. 1, the modulus line is quite flat over the temperature range of about −20 to +120° C., indicating that the modulus of this material remains nearly constant over this temperature range. This is a highly beneficial property of this material, as this temperature range encompasses the range of service temperatures experienced in most bend stiffener applications, including marine oil and gas production applications. The flat modulus response over this temperature range indicates that the stiffness of the material, and therefore its response to applied forces, will be nearly constant, and the material will perform similarly and predictably, across this wide temperature range.

Figure 2:
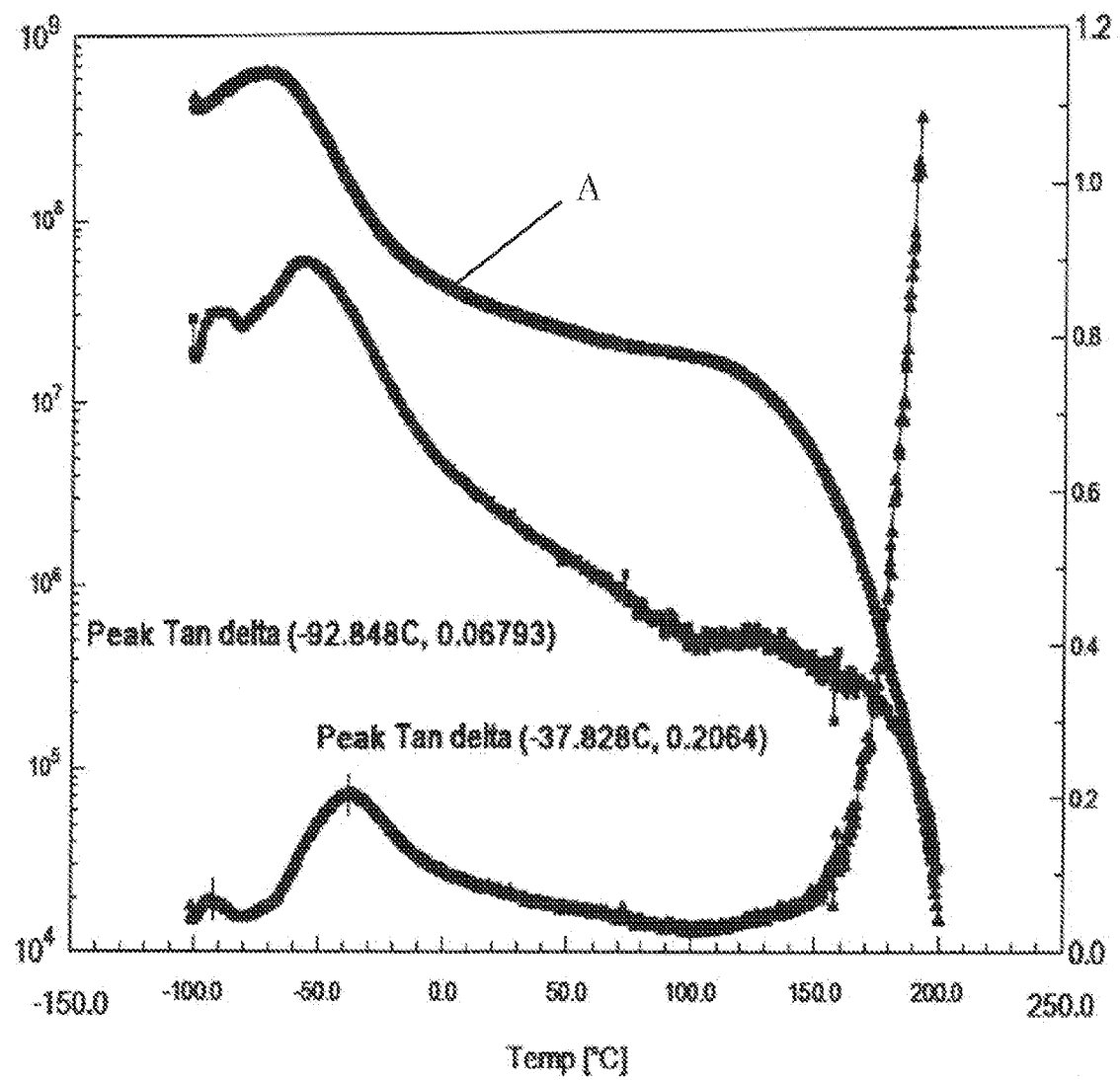
FIG. 2 is a differential thermal analysis tracing for a prior art material.

FIG. 2 shows the results for Comparative Sample A. The modulus for Comparative Sample A drops significantly across the temperature range −20 to +120° C., which indicates that a great loss in stiffness and variability in performance is seen as temperature increases within this range.

To simulate the conditions of a larger, thicker molding, Example 1 and Comparative Sample A are each repeated on a larger scale, processing the starting materials through commercial scale two-component polyurethane dispensing equipment. A portion of each is injected into a 2.5 mm-thick mold, and a larger portion is poured into a large bucket. After curing and conditioning as before, properties are measured for each of the 2.5-mm thick molded samples and from a sample taken from the center of the bucket samples. Results are as indicated in Table 2.

TABLE 2

| Property | Comp. Sample A | | | Example 1 | | |
|---|---|---|---|---|---|---|
| | 2.5 mm mold | Bucket | % Change | 2.5 mm mold | Bucket | % Change |
| Tensile Strength, MPa | 35 | 26.3 | −25% | 49.5 | 38.7 | −22% |
| Elongation at Break, % | 350 | 234 | −33% | 432 | 475 | +9% |
| 100% Modulus, MPa | 14 | 15.9 | 13.6 | 11.8 | 11.4 | −3.4% |

In the thin 2.5 mm mold, it is easy to maintain constant or nearly constant temperature conditions across the sample as it cures. This is more difficult in the thicker bucket castings, because heat applied to the outside of the bucket is not efficiently transferred through the material and, likewise, exothermic heat generated in the center of the sample is not transferred efficiently to the exterior. As a result, larger temperature gradients form in the thicker bucket casting. These temperature gradients can cause inconsistencies in the cure as well as stress cracking. In Comparative Sample A, this results in very large losses in tensile strength and elongation at break. In Example 1, these effects are much smaller, leading to a smaller loss of tensile strength and no loss in elongation at all. This data indicates the much better suitability of Example 1 for making large castings such as bend stiffener sleeves.

Example 1 and Comparative Sample A from the bucket molding experiments are each subjected to fatigue testing. Sample specimens are 50 mm long and 8.5 mm thick. A 5-mm cut is made at one end of the test specimen in each case. The test specimen is then repeatedly stretched to 10% strain in a direction perpendicular to the cut, and allowed to relax after each stretch. The cycling rate is 1.5 Hz. A total of 160,000 cycles are performed. The load required to achieve the 10% strain is measured. The required load correlates to the crack length. Therefore, as the crack propagates, the load needed to produce 10% strain is reduced. After 160,000 cycles, the crack length for Example 1 has increased to 10.6 mm. In Comparative Sample A, the crack length has grown to 31.9 mm, or nearly triple that of Example 1. These results clearly indicate the superior fatigue resistance of Example 1.

EXAMPLES 2, 3 AND 4

Example 1 is repeated three times to produce Examples 2, 3 and 4, respectively. In each case, the amount of poly(tetramethylene glycol) is reduced slightly to adjust the hard segment content upward as indicated in Table 3. Physical properties are measured as before and are as indicated in Table 3.

TABLE 3

| Property | Example 2 | Example 3 | Example 4 |
|---|---|---|---|
| Hard Segment Content, % | 50 | 51.25 | 52.5 |
| Shore D Hardness (BS EN ISO 868) | 48 | 51 | 52 |
| Tensile Strength, MPa (BS 903 Pt A2) | 54 | 41 | 44 |
| Elongation at Break, % (BS 903 Pt A2) | 451 | 443 | 460 |
| Modulus at 100% strain, MPa (BS 903 Pt A2) | 13.8 | 14.0 | 15.8 |
| 6% Secant Modulus, MPa (BS 903 Pt A2) | 65.2 | 72.6 | 87.3 |
| 10% Secant Modulus, MPa (BS 903 Pt A2) | 54.0 | 59.4 | 70.4 |
| Lupke Pendulum Resistance, % (BS 903 Pt 8 Method B) | 47 | 47 | 47 |

What is claimed is:

1. A bend stiffener comprising (i) a flexible polymeric sleeve having a mass of at least 500 kg, an axial bore for receiving an elongated flexible member and (ii) a flange, end plate, locating cylinder-and-sleeve arrangement or guide connector and latch assembly for attaching the sleeve to a support, wherein all or a portion of the flexible polymeric sleeve is a polyurethane elastomer produced in a reaction of an isocyanate-terminated prepolymer and a curing agent at an isocyanate index of 90 to 120, wherein the isocyanate-terminated prepolymer has an isocyanate content of 7 to 15% by weight and is a reaction product of at least one aromatic polyisocyanate and at least one polyether polyol having a hydroxyl equivalent weight of 350 to 2000 and a nominal functionality of 2 to 2.3, and wherein the curing agent is one or more diol chain extenders having an equivalent weight per isocyanate-reactive group of up to 125 or a mixture containing one or more such diol chain extenders and one or more polyether polyols having a hydroxyl equivalent weight of 350 to 2000 and a nominal functionality of 2 to 2.3, and the polyurethane elastomer has a hard segment content from 40 to 60% by weight.

2. The bend stiffener of claim 1, wherein the isocyanate-terminated prepolymer has an isocyanate content of 9 to 12% by weight.

3. The bend stiffener of claim 2, wherein the aromatic polyisocyanate is diphenylmethanediisocyanate (MDI).

4. The bend stiffener of claim 2, wherein the polyether polyol used to make the prepolymer has a hydroxyl equivalent weight of 350 to 750.

5. The bend stiffener of claim 2, wherein the curing agent contains no more than 25% by weight of a polyether polyol having a hydroxyl equivalent weight of 350 to 2000.

6. The bend stiffener of claim 1, wherein the prepolymer is a reaction product of diphenylmethanediisocyanate (MDI) with one or more poly(tetramethylene oxide) diol(s) having a hydroxyl equivalent weight of 350 to 750, and the curing agent is (i) one or more chain extenders or (ii) a mixture of one or more chain extenders, 0 to 10% by weight of one or more poly(tetramethylene oxide) diol(s) and 0 to 10% by weight of one or more crosslinkers, and the prepolymer has an isocyanate content of 9 to 12% by weight.

7. The bend stiffener of claim 2, wherein the chain extender is the only isocyanate-reactive material in the curing agent.

8. The bend stiffener of claim 2, wherein the chain extender is 1,3-propane diol.

9. A method of making a flexible bend stiffener sleeve, comprising mixing an isocyanate-terminated prepolymer and a curing agent at an isocyanate index of 90 to 120, introducing the resulting mixture into a mold and curing the mixture in the mold to form a polyurethane elastomer constituting all or a portion of the sleeve, wherein the isocyanate-terminated prepolymer has an isocyanate content of 7 to 15% by weight and is a reaction product of at least one aromatic polyisocyanate and at least one polyether polyol having a hydroxyl equivalent weight of 350 to 2000 and a nominal functionality of 2 to 2.3 and wherein the curing agent is one or more diol chain extenders or a mixture containing one or more such diol chain extenders and one or more polyether polyols having a hydroxyl equivalent weight of 350 to 2000 and an average nominal functionality of 2 to 2.3, and the polyurethane elastomer has a hard segment content from 40 to 60% by weight, wherein the prepolymer and curing agent are cured in the mold until they have cured sufficiently that the sleeve can be demolded without damage, the sleeve is demolded, and the sleeve is then postcured by heating it outside of the mold for a period of 10 minutes to 24 hours at a temperature of 40 to 120° C. and the sleeve has a mass of at least 500 kg.

10. The method of claim 9, wherein the isocyanate-terminated prepolymer has an isocyanate content of 9 to 12% by weight.

11. The method of claim 10, wherein the aromatic polyisocyanate is diphenylmethanediisocyanate (MDI).

12. The method of claim 10, wherein the polyether polyol used to make the prepolymer has a hydroxyl equivalent weight of 350 to 750.

13. The method of claim 9, wherein the prepolymer is a reaction product of diphenylmethanediisocyanate (MDI) with one or more poly(tetramethylene oxide) diol(s) having a hydroxyl equivalent weight of 350 to 750, and the curing agent is (i) one or more chain extenders or (ii) a mixture of one or more chain extenders, 0 to 10% by weight of one or more poly(tetramethylene oxide) diol(s) and 0 to 10% by weight of one or more crosslinkers, and the prepolymer has an isocyanate content of 9 to 12% by weight.

14. The method of claim 9, wherein the chain extender is the only isocyanate-reactive material in the curing agent.

15. The method of claim 9, wherein the chain extender is 1,3-propane diol.

16. A method for attaching a flexible pipe that extends from an undersea wellhead to a supporting apparatus, comprising inserting the flexible pipe into or through the axial bore of the sleeve of the bend stiffener of claim 1, and affixing the bend stiffener to the supporting apparatus via the flange, end plate, locating cylinder-and-sleeve arrangement or guide connector and latch assembly of the bend stiffener.

17. The method of claim 16, wherein the supporting apparatus is a buoy, a floating or fixed production platform, a ship or other floating structure.

* * * * *